United States Patent [19]

Kitterman et al.

[11] Patent Number: 4,519,960
[45] Date of Patent: May 28, 1985

[54] EXPANDED METAL SADDLE TOWER PACKING

[75] Inventors: B. Layton Kitterman; Donald L. Glaspie, both of Dallas, Tex.

[73] Assignee: Glitsch, Inc., Dallas, Tex.

[21] Appl. No.: 474,534

[22] Filed: Mar. 10, 1983

[51] Int. Cl.³ .................................................. B01F 3/04
[52] U.S. Cl. ..................................... 261/94; 29/157 R; 29/163.5 R; 55/90; 55/233; 55/525; 202/158; 261/DIG. 72; 428/596
[58] Field of Search ........................... 261/94–98, 261/DIG. 72; 55/90, 233, 525; 202/158; 29/157 R, 163.5 R; 428/136, 596; 422/177, 224, 310; 210/150

[56] References Cited

U.S. PATENT DOCUMENTS

| | | | |
|---|---|---|---|
| 2,594,585 | 4/1952 | Ridgway, Jr. | 261/DIG. 72 |
| 3,010,706 | 11/1961 | McWilliams | 261/DIG. 72 |
| 3,206,536 | 9/1965 | Goodloe | 29/163.5 R X |
| 3,232,589 | 2/1966 | Eckert | 261/95 |
| 3,912,634 | 10/1975 | Howell | 55/525 X |
| 4,086,307 | 4/1978 | Glaspie | 261/DIG. 72 |
| 4,256,673 | 3/1981 | Braun | 261/94 |
| 4,303,599 | 12/1981 | Strigle, Jr. et al. | 261/98 |
| 4,333,892 | 6/1982 | Ellis et al. | 261/DIG. 72 |

*Primary Examiner*—Richard L. Chiesa
*Attorney, Agent, or Firm*—Thomas L. Cantrell; Stanley R. Moore

[57] ABSTRACT

Tower packing elements adapted for dumped packing and employed to effect vapor-liquid contact in vapor-liquid contact columns for the purposes of bringing about mass and heat transfer between the liquid and vapor phases. Each packing element is of the saddle variety and is arcuately formed about orthogonal notional axes. The body of the saddle comprises expanded metal; that is, metal that has been perforated, lanced, and/or expanded by stretching along oppositely oriented axes. Also disclosed are methods of forming a segmented, semi-toroidal tower packing element from metal which has been expanded, as well as from metal which has been slitted, and which is expanded at the same time as it is formed into a saddle shape. In this manner, the advantages of metal in tower dump packing can be utilized in a saddle configuration maximizing vapor-liquid contact and efficiency of the mass and heat transfer.

32 Claims, 14 Drawing Figures

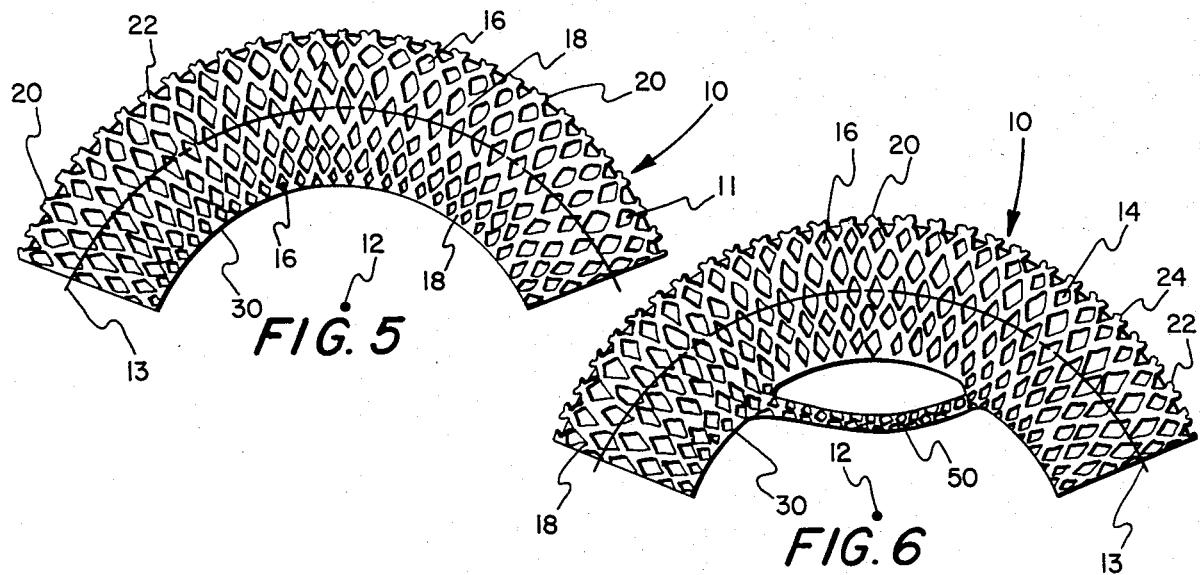
FIG. 5
FIG. 6
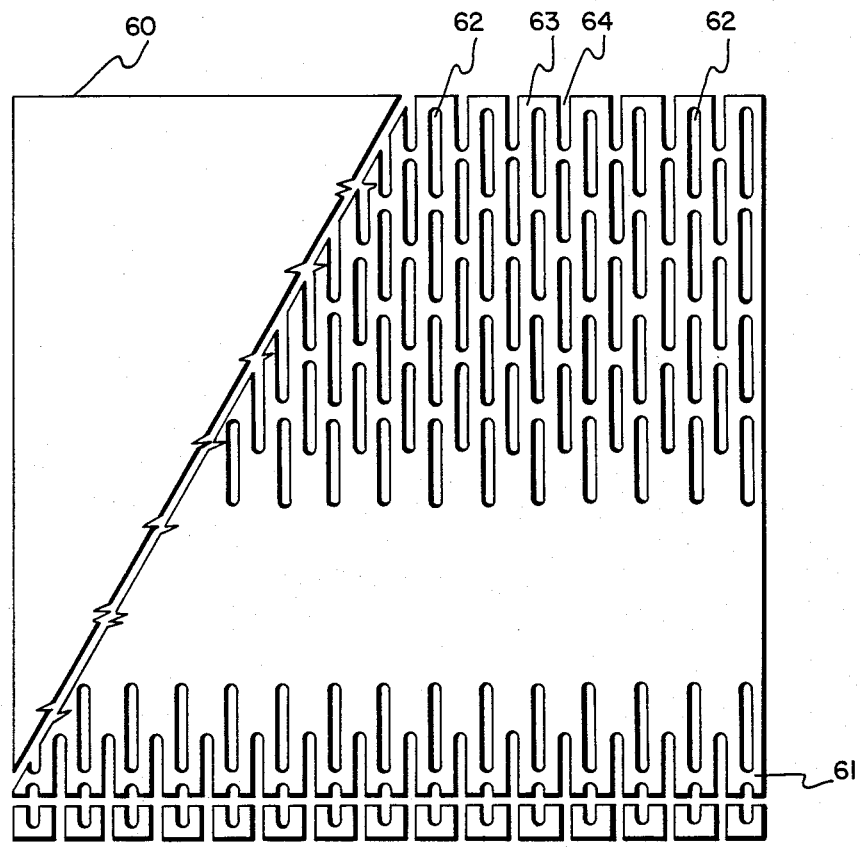
FIG. 7

EXPANDED METAL SADDLE TOWER PACKING

FIELD OF THE INVENTION

The present invention relates to tower packings and, more particularly, to saddle shaped, dumped packing elements for use in process towers.

BACKGROUND OF THE INVENTION

The technology of vapor-liquid process towers is replete with various material designs used for tower packing. The type of tower packing is a function of the particular process to be affected. The packing elements may comprise a structured grid arranged to form a regular array inside the column or they may comprise oblique shapes dumped into and randomly arranged within the tower. The shape of the packing element thus determines the density of the stacked members, the resistance to flow caused thereby and defines the vapor-liquid interface characteristics. Prior art packing members have thus found utility in a variety of shapes, sizes and material forms in both structured array and dumped packing configurations.

Dumped tower packings have found application for considerable time in distillation processes, absorption and desorption processes, gas cleaning and related liquid-gas column process operations. Saddle shaped members have found utility as column packing elements in vapor-liquid contact towers of the kind used to bring about mass and energy transfer between liquid and vapor phases. The packing elements cause intimate flowing contact between the liquid and vapor, which contact is generally countercurrent. Vapor generally passes upwardly through the tower or column and liquid cascades downwardly through the packing. For this reason "packing density" is an important design aspect.

Varieties of prior art dump packings of the "saddle type" are set forth and shown in U.S. Pat. No. 4,303,599 issued in Dec. 1, 1981 to Ralph F. Strigle, Jr. et al and U.S. Pat. No. 4,333,892 issued on June 8, 1982 to Stephen R. M. Ellis et al. These packing elements are constructed of a generally elongated polygonal base member which is substantially flat transversely. The base member is curved about a notional axis to render the overall "saddle" shape. A bridging member is also provided which arcuately spans the curved base member. The bridge increases the strength of the member for permitting lighter weight material. Since the saddles are dumped in place, weight of the saddle stack is an important design aspect. Any bending or distortion of the packing elements affects the mass and heat-exchange efficiency of the process. Moreover, should an underlying packing element collapse, the flow area therethrough could be substantially diminished. In effect, the packing is designed to be sufficiently strong to resist bending and provided in a configuration that when dumped, the elements will not orient themselves out of randomness. Oriented layers of saddles would cause nesting and decrease the flow area to reduce efficiency. The bridge members of the prior art may be seen to limit, to some degree, such orienting of contiguous packing elements.

Another prior art packing element of the saddle variety is set forth in U.S. Pat. No. 4,256,673 issued on Mar. 17, 1981 and assigned to Raschig Gmbh. A double-curved bight portion packing element is shown therein to be constructed of plastic material. The side wall portions of the packing element are formed with relatively smooth corrugations forming a scalloped edge and a series of drip points. The corrugations stiffen the side walls as well as increasing the length of the flow path of the gas and liquid, which is an advantage to transfer efficiency. Such design features are particularly necessary with plastic packing elements due to the problems of structural strength and wetting.

Transversely extending corrugations improve such factors and serve to preclude unnecessary surface contact between parallel juxtaposed packing elements. When substantially solid surfaces, such as prior art saddle side walls come into contact in a tower, fluid flow is interrupted and efficiency reduced. For this reason ribs, holes and corrugations have been shown to improve the vapor-liquid contact and gas turbulence around the packing elements. Unfortunately, wetting is not uniform across a plastic surface and a small number of apertures have a limited effect on the flow pattern. It has thus been found necessary to use structured metal grid arrays, which provide the myriad of wetted vapor-liquid flow patterns and turbulence not achievable with conventional plastic saddles for certain process conditions.

The surface properties of the packing elements, whether in saddle configurations or otherwise, may thus be seen to play an important role in the efficacy of the contact between the liquid and the gas. Surface properties including the propensity of the material to wet and accept the flow of liquid thereacross have thus been emphasized. Materials, such as metal, clearly offer a greater wetting effect but are limited in construction and application.

Because of the practicalities of metal forming, it has not heretofore been feasible or common to form tower packing saddles from metal. This is particularly true of the extreme bidirectional curves of semi-toroidal configurations. The lateral expansion of sheet metal is quickly transformed into shear and/or latent stresses which if not immediately destructive, result in debilitating corrosion under normal tower environmental conditions. Instead, saddle elements have traditionally been constructed of ceramics, or more recently, from plastics as shown above. The weight of ceramic saddles has been shown to be a disadvantage due to structured problems and the breaking of saddles under their own weight. Plastic saddles, because of the properties of the material from which they are formed, are limited in the service temperature which they can endure in a tower environment. Moreover, both plastic and ceramic saddles will "wet" only with difficulty by many of the process liquids. Because of this operation factor the efficiency with which such saddles bring liquids into good exchange contact with vapors is impaired.

The advantage of material having good wetting properties is abundantly recognized in the prior art. However, the choice of material directly affects the possibilities of forming the element such as the saddle. The plastic saddles of the type set forth above are thus generally constructed by injection molding. Ceramic saddles are formed by extrusion and forming or by molding and subsequent firing. Metal saddles of the prior art have been made by punching, stamping and forming material, generally about a single notional axis. The material selection depends upon the expected conditions of heat, pressure and chemical reaction. U.S. Pat. No. 4,333,892 set forth above has taught the use of stamped, corrugated, dimpled and grooved material blanks for use in environments where wetting and heat are major considerations. A packing element formed about a single notional axis of a polygonal base member with a substantially flat transverse body portion is described therein. It is further suggested that such packing elements can be formed of solid or porous metal, metal gauze or expanded metal mesh. Because of the configuration of this and related prior art packing elements, strengthening members are necessarily utilized. Such strengthening members generally comprise the bridge span set forth above which connects intermediate body portions of the substantially flat arched wall regions formed about the single notional axis. The bridge member, of course, adds weight and cost to the design.

Certain other problems remain in prior art dumped packing designs. The bed produced from the dumped packing is constantly subject to vibration from the fluid flow therethrough. Vibration causes settling of non-interlocked members resulting in an increase in flow resistance. Moreover, the packing members which are not easily formed into a structurally sound configuration, affording the greatest process efficiency, are generally only producible from materials in which wetting is not facilitated. The use of metal has been limited to configurations wherein strength may be provided with a minimum of weight. Such shapes are often less efficient and more costly to produce than conventional designs. Moreover, the ability to provide a plurality of fluid transfer points on a packing element, wherein wetting is enhanced, may be severely limited by structural considerations. Although the "saddle variety" of dump packing has been shown to be efficient, such prior art disadvantages need to be overcome.

It would be an advantage therefore to provide a metal dump packing element in a saddle configuration affording ease in forming and overcoming the disadvantages the prior art saddle structures. The packing element of the present invention provides such a design wherein a saddle packing member is arcuately formed from expanded metal about orthogonal notional axis to form a segmented semi-toroidal body. In this manner, light weight, structurally sound packing elements having excellent wetting properties are provided in an interlocking configuration presenting minimum weight, a maximum of flow transfer points, and enhanced fluid flow-through characteristics.

SUMMARY OF THE INVENTION

The present invention relates to tower packing elements of a segmented semi-toroidal shape which are formed of expanded metal. More particularly, the invention includes a dump packing element for use in vapor-liquid contact columns comprising a semi-toroidal body of expanded metal having first and second sidewall curvatures formed about orthogonal notional axes. A bidirectionally curved lattice is then formed with interconnected lands and segmented holes therebetween. The first orthogonal axis comprises a central notional axial element of an inner annular portion of the semi-toroidal body. The second orthogonal axis comprise a semi-circular, notional axial element of the lattice generally orthogonal to the first axis of the semi-toroidal body. The interconnected lands of the curved lattice terminates in oppositely disposed, arrays of perimeter teeth adapted for matingly engaging and interlocking adjacent packing elements in a vapor-liquid contact column, affording fluid transfer therethrough and therebetween.

In another aspect of the invention, the packing element includes oppositely disposed arrays of perimeter teeth formed in substantially semi-circular patterns and disposed in generally parallel spaced relationship. The teeth of the array comprise relatively sharp ends of the expanded metal lattice, interconnected one to the other for affording fluid flow therebetween. The interconnected lands are twisted relative to the orthogonal notional axes for improved exposure of the flow of fluid therealong to a concomitant passage of vapor through said plurality of holes therebetween. The array of perimeter teeth may comprise an arc having an angle which subtends on the order of 90°, 140° as well as 180°. The packing element may also include a semi-toroidal body having an intermediate body portion formed with a radially extended knee protruding inwardly from the intermediate curved lattice for separating packing elements inadvertently nested one against the other. This function facilitates the passage of fluid therebetween.

In yet another embodiment, the invention includes an improved dump packing of the saddle variety utilized in vapor-liquid contact columns and constructed of individual, semi-toroidal bodies adapted for interlocked stacking one against another in random orientation. Such a configuration facilitates the flow of liquid and vapor thereacross. The improvement comprises a semi-toroidal body being constructed of expanded metal which is curved about orthogonal, notional axes to form a lattice of interconnected lands affording a liquid flow pattern thereacross. Segmented apertures are also provided therebetween for affording gas to flow therethrough. The interconnected lands of the curved lattice terminate in oppositely disposed arrays of perimeter teeth adapted for matingly engaging adjacent semi-toroidal bodies and forming a structural connection therebetween and fluid transfer path thereacross. The oppositely disposed arrays of perimeter teeth are formed in substantially semi-circular patterns, and comprise relatively sharp ends of the expanded metal lattice, interconnected one to the other for affording fluid flow therebetween. The interconnected lands are also twisted relative to the orthogonal notional axes for exposing the flow of fluid therealong to a concomitant passage of vapor through the plurality of apertures therebetween.

In yet a further embodiment, the invention includes a method of manufacturing semi-toroidal packing elements for dump packing in a process tower comprising the steps of providing a blank of slotted slit, or louvered metal and bending the metal blank into a first curve about a first notional axis. The blank is then expanded into a second curve about a second notional axis generally orthogonal to the first axis. The expanded metal is terminated in oppositely disposed arrays of curved perimeter teeth adapted for matingly engaging adjacent packing elements in the tower and forming a structural connection and a flow path therebetween. The slotted metal blank is first formed along the first notional axis by bending the blank across a first die into an elongate, arcuate configuration. The step of expanding the slotted metal includes providing a trough formed about first and second notional axis generally orthogonal one to the other. A bending roller may then be matingly received within the trough or a flexible mandrel may be utilized to expand the blank about the second notional axis to form the semi-toroidal packing element.

The expanded metal saddles of the present invention may thus be seen to be highly efficient devices for promoting good vapor-liquid contact for mass and heat exchange purposes. The saddles may be formed from a variety of workable metals, thus overcoming the temperature tolerance disadvantages or weakness of plastic saddles, and making it possible to select metals which are more readily wet by the process liquid of interest than plastic or ceramics. The saddles of the invention are designed to be randomly packed, as are all saddle tower packings, and to provide large, interconnected surface areas replete with vapor passage apertures for liquid to sheet out around for good contact with the flowing vapor.

BRIEF DESCRIPTION OF THE DRAWINGS

For a more complete understanding of the present invention and for further objects and advantages thereof, reference may now be had to the following description taken in conjunction with the accompanying drawing in which:

FIG. 5 is a top plan view of a first alternative embodiment of the expanded metal saddle of FIG. 1:

FIG. 6 is a top plan view of a second alternative embodiment of the expanded metal saddle of FIG. 1:

FIG. 7 is a top plan view of a material blank adapted for fabrication into the expanded metal saddle of FIG.1:

DETAILED DESCRIPTION

Figure 1:
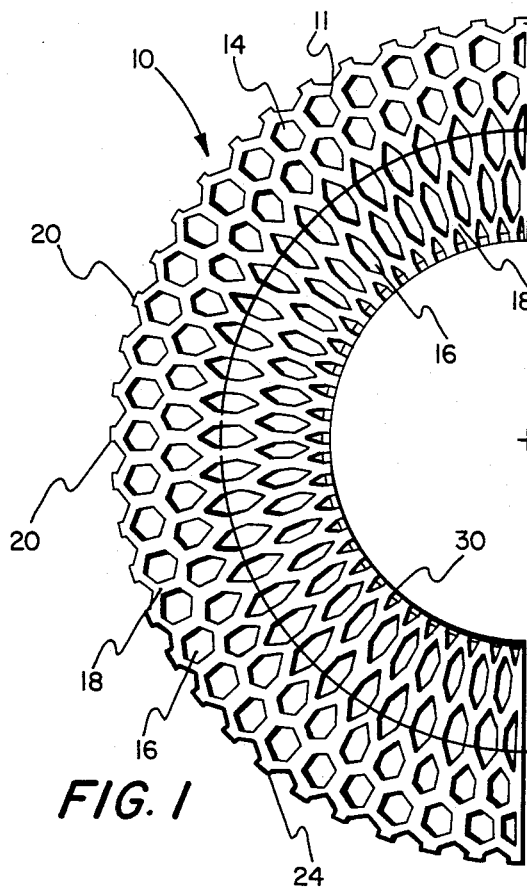
FIG. 1 is a top plan view of an expanded metal saddle constructed in accordance with the principles of the present invention.

Referring first to FIG. 1, there is shown a top plan view of one embodiment of an expanded metal saddle 10 constructed in accordance with the principles of the present invention. The configuration of saddle 10 comprises an inner annular segment of a semi-toroidal ring constructed about orthogonal notional axes 12 and 13 to provide a dump packing element having greatly improved operational characteristics. The body of the saddle 10 is formed of an expanded metal lattice 14 comprising a continuous array of intermittently spaced holes 16 and metal lands 18. The holes 16 are spaced between the metal lands 18 to form the semi-toroidal expanded metal lattice 14. In this manner, a plurality of perimeter teeth 20 are provided across the outer edges 22 and 24 of the saddle 10 which enhances operational efficiency. The teeth 20 matingly engage the lattice 14 of adjacent saddles 10 in a tower to provide structural and flow interconnection therebetween. These and the other advantages of the present invention are set forth below.

Still referring to FIG. 1, the expanded metal saddle 10 is constructed for selective dumped placement within a tower. Dumping results in a randomly oriented array of packing elements and a loose packing density is most desirable. Because of the construction of the saddle 10, the density of the packing is advantageously reduced while the fluid flow characteristics of the packing is maximized. The provision of a multitude of sharp teeth 20, also called drip points, along the outer edge of each saddle 10 serves to increase the liquid vapor interface and to mate with and engage adjacent saddles which is a distinct advantage during vibration of the bed. The points 20 limit packing density by interlocking with adjacent saddles 10 as the teeth 20 of one mate with the teeth 20 and holes 16 of another. This "locking" of randomly oriented saddles 10 thus prevents bouncing of the saddles and further settling of the stack, while affording point-to-point flow contact between mating saddles, as will be discussed in more detail below.

The body 11 of the saddle 10 is integrally formed to afford a massive array of liquid-vapor flow patterns which greatly enhances vapor-liquid contact. Even distribution of fluid flow is provided along the expanded metal lattice 14 around the array of apertures 16 formed therein. In this configuration, upward gas flow in the tower is facilitated around as well as through the saddles 10. The liquid directed upon and sheeted along the land areas 18 of the expanded metal lattice is thus exposed on a plurality of sides to the updraft of gas within the tower.

Figure 2:
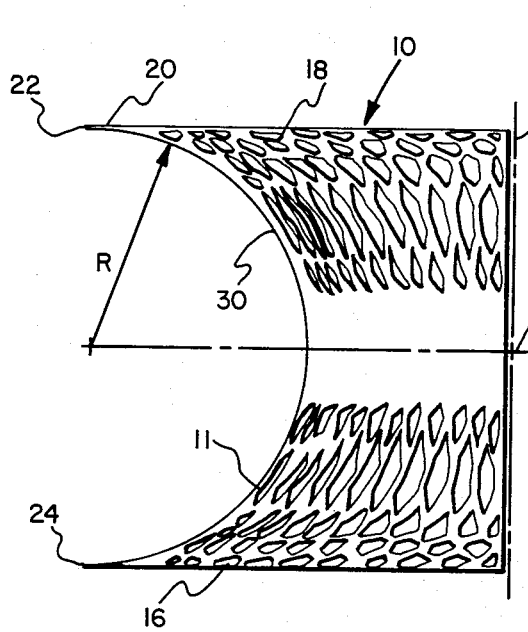
FIG. 2 is a side elevational view of the expanded metal saddle of FIG. 1.

Referring now to FIG. 2 there is shown an end elevational view of the saddle 10 of FIG. 1. The saddle 10 is shown to be comprised of a segmented, semi-toroidal ring of arcuate outer configuration comprising curved wall portion 30. The toroidal segment comprises the inner annular portion of a 180. toroidal region which is segmented cylindrically through notional axis 13 concentric with axis 12. The wall portion 30 of the particular embodiment shown herein is thus being formed about a radius R along axis 13. The notional axis 13 of the curve of the outer wall 30 may also be seen to be orthogonal to the notional axis 12 of the curve of the body 11 of the saddle 10 shown in FIG. 1. This duality of curved "toroidal" construction of the expanded metal of the present invention affords numerous advantages over conventional saddle and related packing element designs of the prior art. For example, the expanded metal body 11 is substantially relieved of the stress of formation which can cause serious corrosion problems if left unrelieved. Moreover, the expanded lattice provides a body replete with holes 16 to permit the passage of vapor through rather than simply around the saddle.

Figure 3:
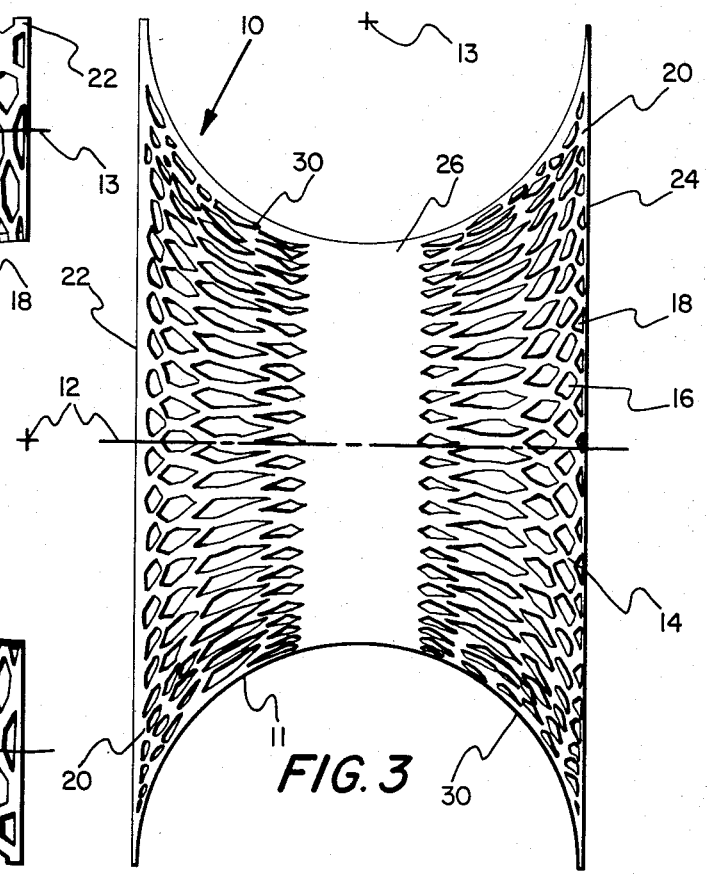
FIG. 3 is front elevational view of the expanded metal saddle of FIG. 1.

Referring now to FIG. 3 there is shown a front elevational view of the body 11 of saddle 10 of FIG. 1. The apertured, arcuate wall surface 30 may be seen to extend semi-toroidally around the body of the saddle. The expanded metal lattice 14 may likewise be seen to vary in lateral expansion from opposite edges 22 and 24 to the central region 26 thereof. The varied expansion of the metal grid 14 affords the segmented, semi-toroidal configuration of the saddle 10. The metal lattice 14 facilitates expansion around the orthogonal, notional axes 12 and 13 through its ability to concomitantly deform across orthogonal planes. Sheet metal can generally only deform across a single plane without shear failure and high residual stress. The lattice 14 thus adds a second mode of formation and stress relief. The versatility of forming expanded metal in the semi-toroidal configurations shown herein also facilitate a plurality of axial alignments, shapes and angulations adaptable for particular applications as will be defined in more detail below.

Figure 4:
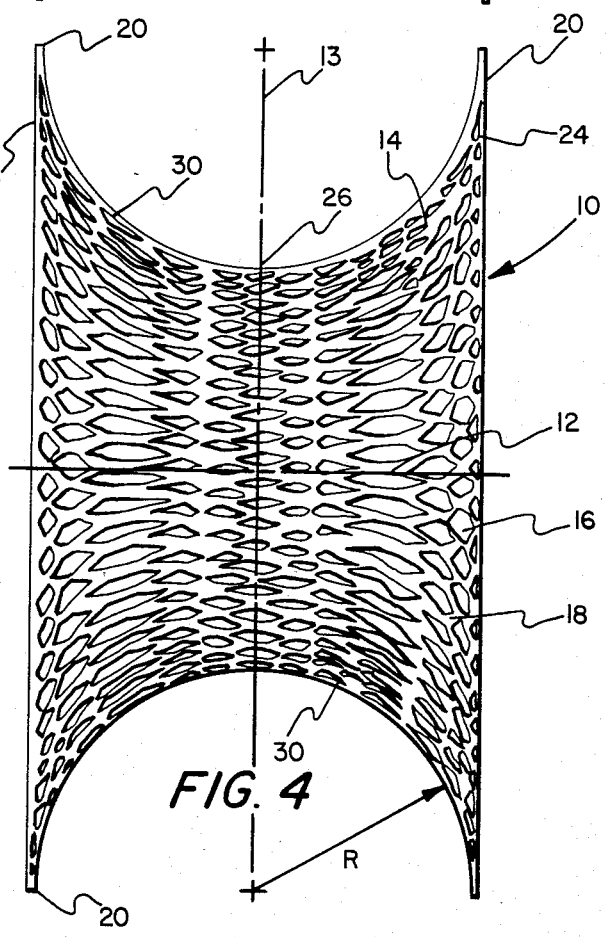
FIG. 4 is a rear elevational view of the expanded metal saddle of FIG. 1.

Referring now to FIG. 4, there is shown a rear elevational view of the saddle 10 of FIG. 3. The saddle 10 appears substantially identical in both front and rear elevational views due to the expanded metal construction. This feature is, however, more than a pictorial similarity, because it illustrates the identicality between the front and rear portions of said saddle relative to the fluid flow. Gas and liquid flow within a tower thus encounters substantially the same flow "picture" irrespective of the front or rear orientation of the saddle 10. This affords a degree of "programmability" in that the flow pattern is much more predictable and not as susceptible to alterations in packing density and settling. As stated above, once the saddles 10 have been dumped the drip points 20, comprising sharp, sheared teeth around the latice 14, mate with and lock into the holes 16 of adjacent saddles. This step in effect "secures" the stack configuration. The expanded metal grid configuration also affords a substantially unimpeded gaseous flow pattern wherein gas is permitted to flow not only around the walls 30 of the saddle 10 but directly and turbulently through the holes 16 of the body portion, between the expanded lands 18. As stated above, this vastly expanded turbulent flow feature greatly increases the fluid to gas interface ratio as compared to ceramic or plastic saddles of the prior art.

Referring now to FIG. 5, there is shown a top plan view of an alternative embodiment of the saddle 10 of the present invention. The angular span of the body 11 of the saddle 10 about notional axis 12 is shown to be reduced, which configuration may be more desirable under particular process conditions. The expanse of material about notional axis 13 may likewise be varied. Obviously less metal may be required to form the saddle 10 of FIG. 5 than that of FIG. 1 if the material expansion about the notional axes 12 and 13 is taken to the same degree. Likewise, the same material blank as that used in FIG. 1, may be utilized and expanded to a lesser degree to form the saddle body 11 of FIG. 5. This would result in less grid expansion and more surface land area for the fluid interface per square unit size of holes 16. FIG. 5 thus illustrates the versatility in formation of the saddle 10 of the present invention for providing a select flow characteristic as well as surface configuration and which features may vary the gas to fluid flow ratio. Although the number of holes 16 relative to the land area 18 may not vary, the hole size relative to size of the land surface area is a function of the degree of expansion.

Referring now to FIG. 6, there is shown an alternative embodiment of the saddle 10 of FIG. 5, wherein an intermediate knee 50 is formed in the central arcuate surface 30 of the saddle 10. The knee 50 is formed from the body portion 11 of the inside surface 30 of the saddle 10 by stamping or the like. The span of expanded metal forming the knee 50 is bowed outwardly from the inner surface 30 of the saddle. The bowed knee affords the saddle 10 with an anti-nesting feature for spacing one saddle 10 from another in the event the body of one saddle would matingly engage the body of an adjacent saddle. The projection of the knee 50 away from the body portion 30 of the saddle body 11 simply functions as a stand-off when adjacent saddles are nested one into the other. Such a knee 50 is an optional feature in that under normal dumped packing conditions the barbed ends 20 of the lattice 14 aggressively engage the apertures 16 and adjacent barb areas 20 to resist nesting and compact packing. While compact packing would be an advantage in most assemblies it is a disadvantage in the functional operation of most process towers. Packing elements such as the saddle 10 are thus provided for occupying the greatest volume of fluid distribution surfaces while minimizing the resistance to gas flow therethrough. It is likewise important that minimum surface area of contiguous saddles contact one another in a dumped packing configuration. Contacting areas interrupt the fluid flow. The expanded metal saddle 10 of the present invention is designed to afford stacking along a multitude of finite points 20 comprising the barbed ends or teeth of the semi-toroidal edges 22 and 24.

Referring now to FIG. 7, there is shown a top plan view of an expanded metal blank 60 for use in fabricating a saddle 10 in accordance with the principles of the present invention. The blank 60 is comprised of stainless steel or the like, having a network of flat metal lands 61 with a plurality of slotted apertures 62 formed therebetween, preferably in parallel spaced alignment and in staggered offset rows 63 and 64. A material sheet of this configuration may be expanded and bi-directionally formed and/or punched to form the body 11 of the saddle 10. The staggered slot pattern permits the lands 61 to bend and twist relative to one another to form an interconnected flow matrix without the residual stress or shear failure that would be imposed upon a solid sheet of metal stretched to the magnitudes set forth herein.

Figure 8:
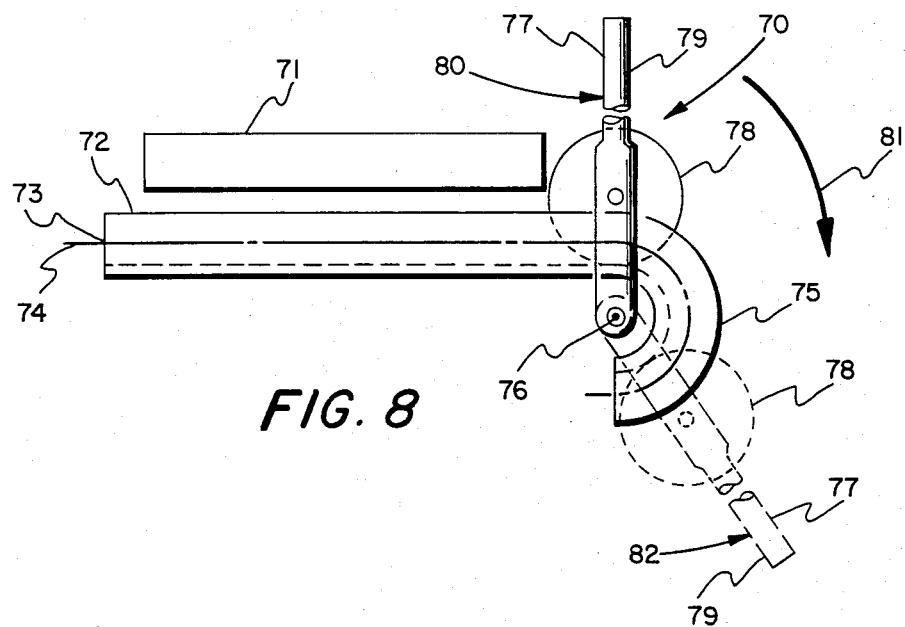
FIG. 8 is a side elevational, diagrammatical view of a first method and apparatus, for fabricating the metal saddle of FIG. 1.

Referring now to FIG. 8, there is shown a diagrammatical side elevational view of one embodiment of method and apparatus for manufacturing the saddle 10 of the present invention. The system 70 of FIG. 8 comprises an elongate, arcuately formed trough 72. The trough 72 has a first curvature 73 about an axis 74 adapted for bending and/or simply receiving the arcuate surface 30 defining notional axis 13 of the saddle 10 of FIG. 1. A shaft 71 may be received into mating trough 72 for forming said curve. A second arcuate die region 75 is formed along an axis 76 orthogonal to the axis 74. Die region 75 is a curved extension of trough 72 adapted for forming the second element of the semi-toroidal arc of the body portion of the saddle 10 of the present invention across notional axis 12. A bending yoke 77 is next provided with a bending roller comprising a rotational male member 78 of the requisite spheroid configuration to mate with the arcuate female die 75. The spheroid roller 78 provides rotational movement about axis 76 of the female die 75. A handle 79 is shown for illustrating motion of the bending roller 78 while matingly engaging the female die section 75. The handle 79 is shown in upper position 80 prior to rotation in the direction of arrow 81 to lower position 82. In this manner, a material blank 60 which is pre-formed about notional axis 13 may be positioned between the arcuate dies 75 and 78 and deformed through bidirectional expansion into the semi-toroidal body shown. Material 60 may then be continually fed through trough 72, bent into the semi-toroidal shape afforded by forming dies 75 and 78 and cut to length. Such bending and arcuate forming operations may be effected manually, as shown, or through conventional automation techniques.

Figure 9:
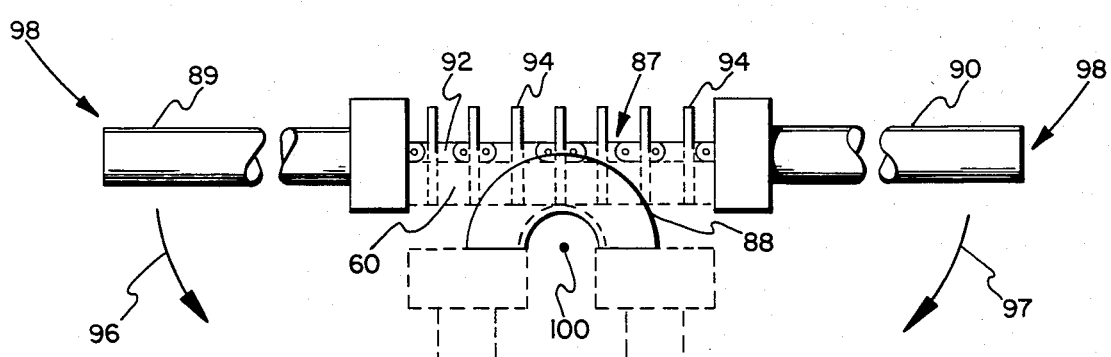
FIG. 9 is a front elevational, diagrammatical view of a second method and apparatus for fabricating the metal saddle of FIG. 1.

Referring now to FIG. 9, there is shown a second embodiment of a method and apparatus for constructing the saddle 10 in accordance with the principles of the present invention. The hand forming apparatus of FIG. 9 includes a flexible mandrel 87 which is matingly received around a female die 88. The mandrel 87 is comprised of a pair of oppositely disposed handles 89 and 90 joined together by as chain link cable 92 which affords conforming flexibility to the system. A series of parallel spaced discs 94 are affixed to the cable 92. Each disc 94 is formed to matingly engage the female die 88, with a curvature for forming the arcuate surface 30 of saddle 10 about notional axis 12. Material 60 which is either bent upon the mandrel 87 or preformed about notional axis 13 is positioned upon the lower section of the mandrel 87. The handles 89 and 90 are then brought downwardly in the direction of arrows 96 and 97, respectively, from loading position 98 to forming position 99 (shown in phantom). The material blank 60 is thereby expanded about notional axis 100 to form the semi-toroidal metal lattice 11 of saddle 10.

Figure 10:
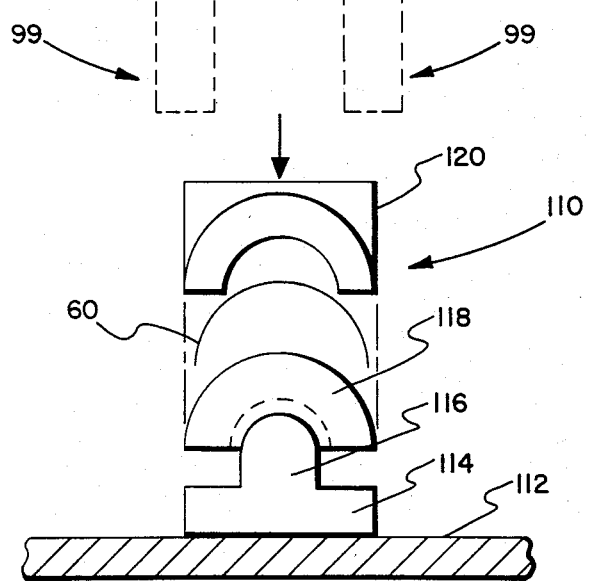
FIG. 10 is a front elevational, diagrammatical view of a third method and apparatus for fabricating the expanded metal saddle of FIG. 1 in accordance with the principles of the present invention.

Referring now to FIG. 10, there is shown a conventional stamping die 110 comprising a third embodiment of a method and apparatus for constructing the dump packing saddle 10, in accordance with the principles of the present invention. A die base 112 is thus provided with a support block 114 secured thereon. Support 114 incorporates an arcuate central region 116 for supporting a female saddle forming die 118. An upper male forminging die section 120 is provided for reciprocal movement relative to the underlying female die 118 and the deformation of a pre-formed slotted material blank 60 (as set forth above) positioned therebetween. Stamping die assemblies may be relatively more expensive to fabricate than the rotational and pivotal die devices of FIGS. 8 and 9 but afford certain advantages, including precise coining control of the saddle elements impressed therebetween.

In operation, the desirable shape and size of saddle element 10 is incorporated into a suitable metal forming die, such as that set forth in FIGS. 8-10. A metal blank 60 is selected having the requisite ductility, thickness and perforation pattern for the selected expansion mode. Oblong slots in a side staggered pattern, as set forth in FIG. 7 have been shown to be effective. Such patterns can be produced from coiled strip material with conventional progressive dies (not shown). The material is preferably selected for expansion into the semi-toroidal shape set forth in FIGS. 1-6 without imparting significant built in, or latent, stresses. Because the metal pattern is slotted, it may be deformed within definable limits across orthogonal axes without shear failure. Expansion in a direction lateral to the slotted sections, as imparted when being formed about notional axis 12 is afforded by the twisting and separating of adjacent lands 18. The expansion of the metal lattice 11 increases outwardly and in opposite directions from the center of the annular side wall 30 toward the perimeter teeth 20. The lateral expansion and twisting of the interconnected lands 18 relieves stress build up. Unrelieved stress has been shown to cause corrosion under the chemical reactions typical of process towers. Since the lands 18 are curved and twisted, vapor passing through the holes 16 is dynamically exposed to more surface area of liquid flowing thereon. Moreover, since each land 18 is interconnected to the other, a myriad of liquid flow paths are provided to carry liquid from one saddle to another in a dumped stack within a tower. The flow patterns provided by an expanded metal lattice are shown and discussed more fully in co-pending patent application serial numbers 506,417 and 506,534 assigned to the assignee of the present invention. As described therein, the laminar liquid flow along the twisted lands 18 is substantially tantamount to a turbulent flow with regard to the vapor flow thereover. This is particularly advantageous for high efficiency operation and is accentuated in the present invention by the dual curve body portion of the saddle 10.

Figure 11:
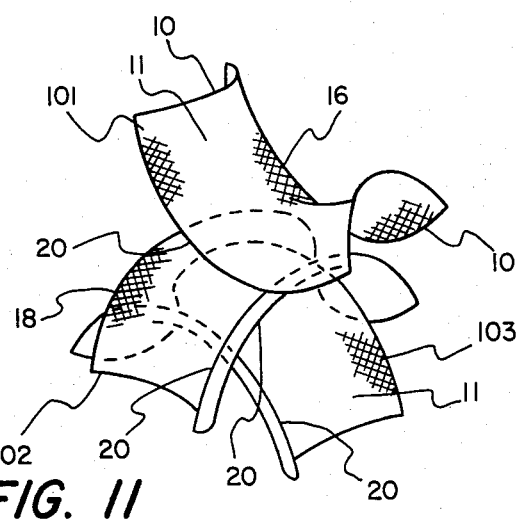
FIG. 11 is a perspective view of three of the saddles of FIG. 1 in a stacked configuration.

Referring now to FIG. 11, there is shown a plurality of saddles 10 in stacked engagement. An upper saddle 101 is shown stacked upon and interlocked with an intermediate saddle 102 and an underlying saddle 103. The angular orientation between the respective saddles and the mating engagement shown herein is provided for purposes of illustrating at least two of a myriad of saddle stacking configurations which could occur. Each saddle 10 is a dump packing element, which means that a multitude of random stacking configurations will occur within a packing column. Of the many stacking configurations, however, there are particularly two which illustrate key features of the present invention.

Still referring to FIG. 11, saddle 101 is shown engaging saddle 102 across the perimeter teeth 20 of each. The meshing engagement of perimeter teeth 20 of interlocking saddles, is prevalent with the present invention due to the wide arcuate span of edge 22 and 24 and sharpness of the perimeter teeth 20 therearound. It may be seen that the longest edge portions of the body 11 of the saddle 10 is comprised of the perimeter teeth 20 and therefore engagement between adjacent saddles 10 is often dominated by the interconnecting teeth 20. This is a distinct advantage because the lattice 14 terminating in teeth 20 is stretched to its widest point of expansion in the body 11 due to the pattern of formation across orthogonal notional axes. The expansion holes 16 between lands 18 are thus presented in their widest dimension immediately adjacent teeth 20, further facilitating perimeter-meshed engagement.

Referring particularly now to the interlocking engagement between lower saddles 102 and 103 of FIG. 11, there is shown the mating engagement between the teeth 20 of saddle 103 and the body portion 11 of upper saddle 102. In this configuration the perimeter teeth 20 of saddle 103 project into the holes 16 of the body portion 11 of the saddle 102. This engagement likewise secures and prevents bouncing of the individual saddles 20 during conventional vibratory motion of the stacked bed. The various saddles 10 may of course orient themselves into any of a myriad of directions and orientations with respect to one another. The interlocking of the teeth 20 with various body portions of adjacent saddles will, however sufficiently interlock sections of the bed to substantially reduce the deleterious vibratory and settling affects conventionally plaguing process towers utilizing dumped packing.

Figure 12:
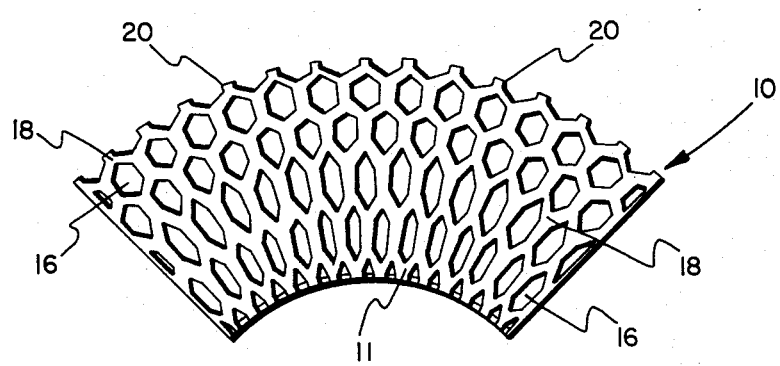
FIG. 12 is a top plan view of a third alternative embodiment of the expanded metal saddle of FIG. 1.

Referring now to FIG. 12, there is shown an alternative embodiment of a saddle 10 constructed in accordance with the principles of the present invention. The saddle 10 shown in FIG. 12 is constructed with a body portion having a 90° arc as compared with the 180° arc of the saddle 10 of FIG. 1. A greater number of saddles of the 90° configuration would, of course, be required for the equivalent packing tower volume, as compared to the saddle of FIG. 1. However, various operational considerations and/or material factors may necessitate a packing element of reduced arcuate size. It should be observed also that the size of the expanded metal lattice 14 may also be varied in material thickness and expansion in any of the saddle configurations shown herein.

Figure 13:
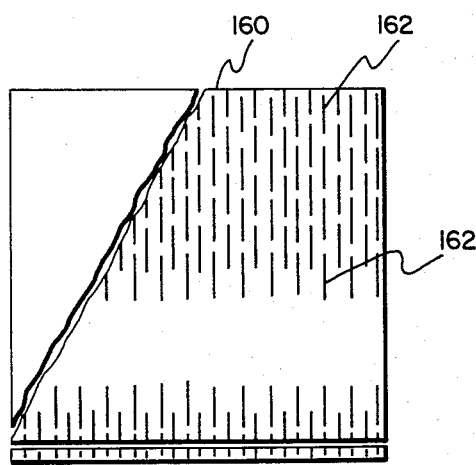
FIG. 13 is a top plan view of a first alternative embodiment of a material blank adopted for fabrication into an expanded metal saddle in accordance with the principles of the present invention.
Figure 14:
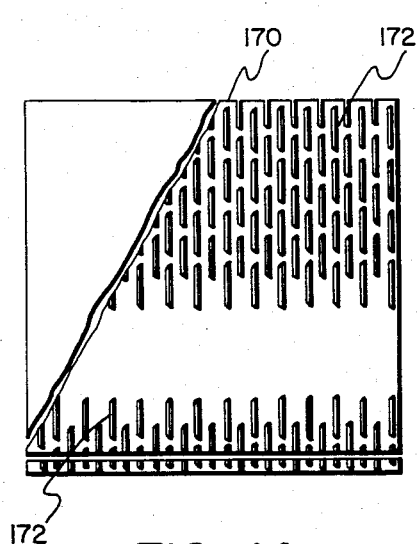
FIG. 14 is a top plan view of a second alternative embodiment of the material blank of FIG. 13.

Referring now to FIG. 13 and 14, there are shown two alternative embodiments of the material 60 for fabricating the saddle 10 of the present invention. FIG. 13 illustrates one embodiment of a blank 160 of staggered serrated construction as compared to the staggered slotted blank of FIG. 7. The staggered serrations 162 may provide an expanded metal saddle 10 having more narrow hole sections 16 than a saddle 10 fabricated from the slots 62 of blank 60. Likewise, FIG. 14 illustrates a second embodiment of a material blank such as stainless steel for fabricating the saddle 10. The blank 170 of FIG. 14 is constructed with a plurality of louvered sections 172 in place of the slots 62 of FIG. 7. The louvered regions 172 will deform to some degree during the bi-directional bending of the blank 170 across orthogonal notional axes. Such twisting of deformed tabular regions create flow vanes desirable for certain process tower operations. Numerous other stamp pattern embodiments may of of course be incorporated in constructing the structure of the present invention.

It may be seen that a plurality of configurations of saddle 10 may be constructed from the methods and apparatus set forth herein, in accordance with the principles of the present invention. For example, the radius of curvature of the sidewalls of the saddle 10 may be modified into a myriad of shapes and sizes for particular tower applications. Likewise, the size of the metal packing and the method of formation may be varied in conjunction with the particular application. It is thus believed that the operation and construction of the present invention will be apparent from the foregoing description. While the apparatus as shown and described has been characterized as being preferred it will be obvious that various changes and modifications may be made therein without departing from the spirit and scope of the invention as defined in the following claims.

What is claimed:

1. A dump packing element for use in vapor-liquid contact columns adapted for the flow of fluids therethrough and a turbulent interface therein, said element comprising:
    a semi-toroidal body of expanded metal formed from a slotted material blank having first and second sidewall curvatures formed about orthogonal notional axes to comprise a bi-directionally curved lattice of interconnected lands and segmented holes therebetween;
    said semi-toroidal body being deformed across said orthogonal nontional axes to comprise an expanded metal body of varying magnitudes of lateral expansion and a variably expanded lattice of interconnected lands and segmented holes therebetween adapted for receiving the flow of fluid therethrough and imparting turbulence thereto;
    said first orthogonal axis comprising a central notional axial element of an inner anular portion of said semi-toroidal body;
    said second orthogonal axis comprising a semi-circular, notional axial element of said lattice generally orthogonal to said first axis of said semi-toroidal body;
    said slots of said material blank being formed generally orthogonally to said second orthogonal axis and expanded generally in the direction thereof, said magnitude of expansion varying relative to said central notional axial element; and
    said interconnected lands of said curved lattice terminating in oppositely disposed, arrays of perimeter teeth adapted for matingly engaging segmented holes of adjacent packing elements in a vapor-liquid contact column to secure said engagment during fluid flow through the variably expanded holes therein and affording fluid transfer therebetween.

2. The packing element as set forth in claim 1 wherein said oppositely disposed arrays of perimeter teeth are formed in substantially semi-circular patterns, disposed in generally parallel spaced relationship.

3. The packing element as set forth in claim 2 wherein said teeth of said array comprise relatively sharp ends of said expanded metal lattice, interconnected one to the other for affording fluid flow therebetween.

4. The packing element as set forth in claim 1 wherein said interconnected lands are twisted relative to said orthogonal notional axes for exposing the flow of fluid therealong to a concommitant passage of vapor through said plurality of holes therebetween.

5. The packing element as set forth in claim 1 wherein said array of perimeter teeth comprise an arc having an angle which subtends on the order of 140°.

6. The packing element as set forth in claim 1 wherein said array of perimeter teeth comprise an arc having an angle which subtends on the order of 180°.

7. The packing element as set forth in claim 1 wherein said array of perimeter teeth comprise an arc having an angle which subtends on the order of 90°.

8. The packing element as set forth in claim 1 wherein said semi-toroidal body further comprises an intermediate body portion being formed with a radially extending knee protruding inwardly from said intermediate curved lattice for separating packing elements inadvertently nested one against the other for facilitating the passage of fluid therebetween.

9. The packing element as set forth in claim 1 wherein said lattice expands outwardly in opposite directions from an intermediate body portion along said second notional axis to terminate in said opposed arrays of perimeter teeth.

10. The packing element as set forth in claim 9 wherein said perimeter teeth comprise ends of said expanded metal lattice terminated with a sufficiently narrow cross section to be received into holes of a lattice of adjacent packing elements within a vapor-liquid contact tower for structurally interconnecting said packing elements one to the other and providing a liquid flow path thereacross.

11. Improved dump packing elements of the saddle variety utilized in vapor-liquid contact columns adapted for the flow of fluids therethrough and a turbulent interface therein, said elements each comprising individual, semi-toroidal bodies adapted for stacking one against another in random orientation for theflow of liquid and vapor thereacross, wherein the improvement comprises said semi-toroidal body being constructed of expanded metal formed from a slotted material blank which is, deformed across orthogonal notional axes to comprise an expanded metal body of varying magnitudes of lateral expansion and a variably expanded lattice of interconnnected lands and segmented holes therebetween adapted for receiving the flow of fluid therethrough and imparting turbulence thereto, and said interconnected lands of said curved lattice terminating in oppositely disposed arrays of perimeter teeth adapted for matingly engaging segmented holes of adjacent semi-toroidal bodies and forming a structural connection therebetween to secure said engagement during fluid flow through said variably expanded holes therein and a fluid transfer path thereacross.

12. The packing element as set forth in claim 11 wherein said oppositely disposed arrays of perimeter teeth are formed in substantially semi-circular patterns, disposed in generally parallel spaced relationship.

13. The packing element as set forth in claim 12 wherein said teeth of said array comprise relatively sharp ends of said expanded metal lattice, interconnected one to the other for affording fluid flow therebetween.

14. The packing element as set forth in claim 11 wherein said interconnected lands are twisted relative to said orthogonal notional axes for exposing the flow of fluid there-along to a concommitant passage of vapor through said plurality of apertures therebetween.

15. The packing element as set forth in claim 11 wherein said array of perimeter teeth comprise an arc having an angle which subtends on the order of 140°.

16. The packing element as set forth in claim 11 wherein said array of perimeter teeth comprise an arc having an angle which subtends on the order of 180°.

17. The packing element as set forth in claim 11 wherein said array of perimeter teeth comprise an arc having an angle which subtends to the order of 90°.

18. The packing element as set forth in claim 11 wherein said semi-toroidal body further comprises an intermediate body portion being formed with a radially extending knee protruding inwardly from said intermediate curved lattice for separating packing elements inadvertently nested one against the other for facilitating the passage of fluid therebetween.

19. The packing element as set forth in claim 11 wherein said lattice expands outwardly and in opposite directions from an intermediate body portion along said second notional axis to terminate in said opposed arrays of perimeter teeth.

20. The packing element as set forth in claim 19 wherein said perimeter teeth comprise ends of said expanded metal lattice terminated with a sufficiently narrow cross section to be received into holes of a lattice of adjacent packing elements within a vapor-liquid contact tower for structurally interconnecting said packing elements one to the other and providing a liquid flow path thereacross.

21. An improved dump packing bed for vapor-liquid contact columns constructed of individual, semi-toroidal elements adapted for stacking one against another in random orientation for the flow of fluids thereacross and a turbulent interface therein, wherein the improvement comprises said semi-toroidal elements being constructed of expanded metal formed from a slotted material blank deformed across orthogonal notional axes to comprise an expanded metal body of varying lateral expansion and a variably expanded lattice of interconnected lands and segmented holes therebetween adapted for receiving the flow of fluid therethrough and imparting turbulence thereto said interconnected lands of said curved lattice terminating in oppositely disposed arrays of perimeter teeth, and said teeth of said semi-toroidal elements matingly engaging segmented holes of adjacent semi-toroidal elements to secure said engagement during fluid flow through said variably expanded holes therein.

22. The packing bed as set forth in claim 21 wherein said oppositely disposed arrays of perimeter teeth of each semi-toroidal body are formed in substantially semi-circular patterns, disposed in generally parallel spaced relationship.

23. The packing bed as set forth in claim 22 wherein said teeth of said array comprise relatively sharp ends of said expanded metal lattice, interconnected one to the other for affording fluid flow therebetween.

24. The packing bed as set forth in claim 21 wherein said interconnected lands of said semi-toroidal bodies are twisted relative to said orthogonal notional axes for exposing the flow of fluid there-along to a concommitant passage of vapor through said plurality of apertures therebetween.

25. The packing bed as set forth in claim 21 wherein said array of perimeter teeth of said semi-toroidal bodies comprise an arc having an angle which subtends on the order of 140°.

26. The packing bed as set forth in claim 21 wherein said array of perimeter teeth of said semi-toroidal bodies comprise an arc having an angle which subtends on the order of 180°.

27. The packing bed as set forth in claim 21 wherein said array of perimeter teeth of said semi-toroidal bodies comprise an arc having an angle which subtends on the order of 90°.

28. The packing bed as set forth in claim 21 wherein each of said semi-toroidal bodies further comprises an intermediate body portion being formed with a radially extending knee protruding inwardly from said intermediate curved lattice for separating packing elements inadvertently nested one against the other for facilitating the passage of fluid therebetween.

29. The packing bed as set forth in claim 21 wherein said lattice expands outwardly and in opposite directions from an intermediate body portion along said second notional axis to terminate in said opposed arrays of perimeter teeth.

30. The packing bed as set forth in claim 29 wherein said perimeter teeth comprise ends of said expanded metal lattice terminated with a sufficiently narrow cross section to be received into holes of a lattice of adjacent semi-toroidal bodies within a vapor-liquid contact tower.

31. The packing bed as set forth in claim 30 wherein said perimeter teeth of certain ones of said adjacent semi-toroidal bodies structurally interconnect one with the other within said bed.

32. The packing bed as set forth in claim 30 wherein said perimeter teeth of certain ones of said toroidal bodies engage said segmented apertures of adjacent bodies for structurally interconnecting one with the other within said bed.

* * * * *